UNITED STATES PATENT OFFICE.

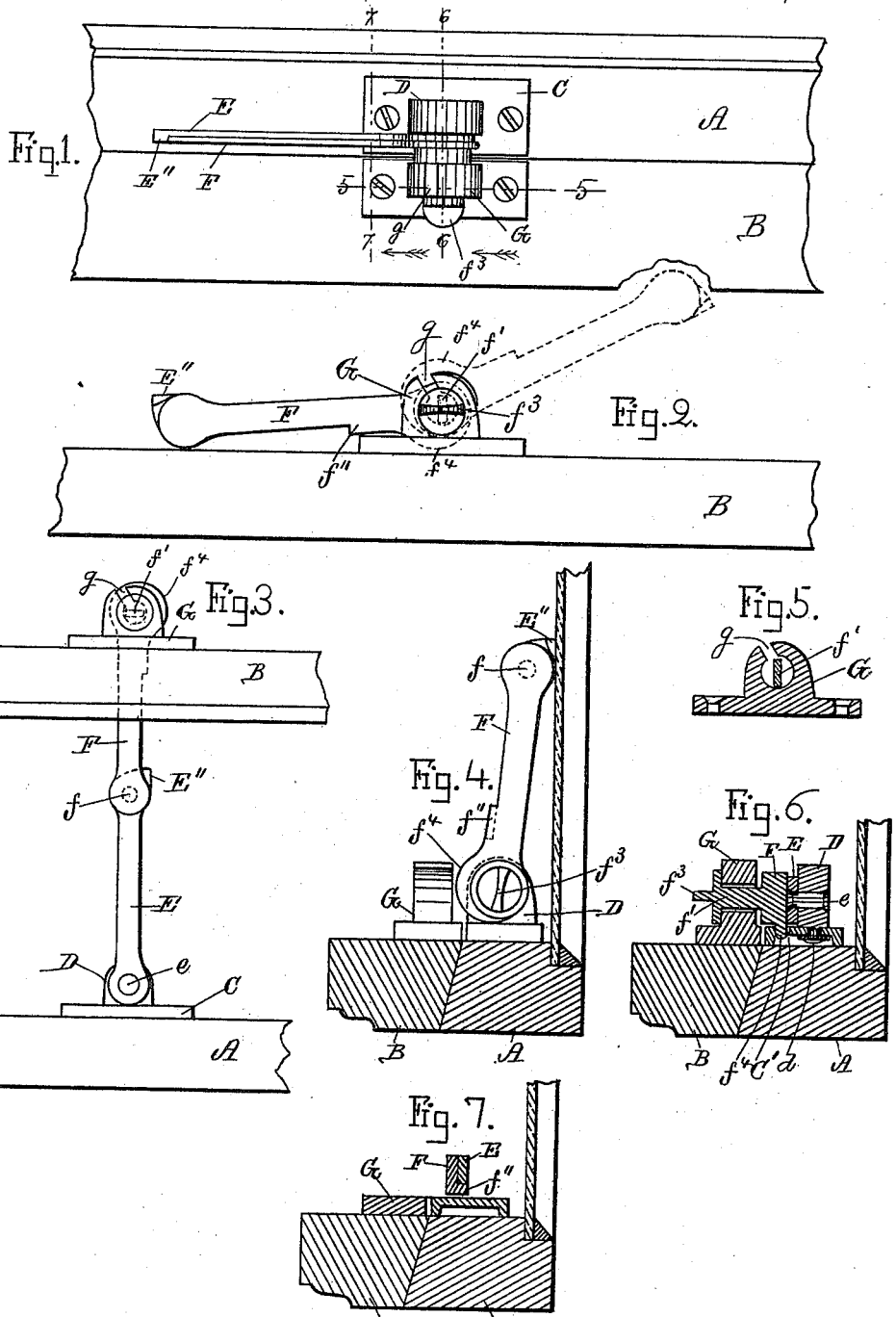

CHARLES M. FOWLER, OF WORCESTER, MASSACHUSETTS, ASSIGNOR TO FRANK E. WELLINGTON, OF SAME PLACE.

SASH-FASTENER.

SPECIFICATION forming part of Letters Patent No. 600,862, dated March 22, 1898.

Application filed November 13, 1897. Serial No. 658,509. (No model.)

*To all whom it may concern:*

Be it known that I, CHARLES M. FOWLER, a citizen of the United States, and a resident of Worcester, in the county of Worcester and State of Massachusetts, have invented new and useful Improvements in Window-Fasteners, of which the following, taken in connection with the accompanying drawings, is a specification.

This invention relates to improvements in window-sash fasteners of the kind shown and described in the patent granted to me November 20, 1896, No. 572,052; and it consists in mechanism for holding the sashes pressed together when the device is locked, as will hereinafter be more fully shown and described, reference being had to the accompanying drawings, wherein—

Figure 1 represents a top plan view of the invention, shown in locked position. Fig. 2 represents a front view of Fig. 1, showing in dotted lines the position of the links ready for unlocking. Fig. 3 represents a front elevation of the invention, showing the links expanded for holding the window-sashes at a proper distance from each other for ventilating purposes. Fig. 4 represents a sectional view of the sashes and showing the fastener unlocked to permit the sashes to move freely by each other. Fig. 5 represents a cross-section on the line 5 5, shown in Fig. 1. Fig. 6 represents a cross-section on the line 6 6, shown in Fig. 1; and Fig. 7 represents a cross-section on the line 7 7, shown in Fig. 1.

Similar letters refer to similar parts wherever they occur on the different parts of the drawings.

In the drawings, A represents the meeting-rail of the outer sash, and B represents the meeting-rail of the inner sash, of windows, as usual.

C is a metal plate secured to the top of the rail A, and to said plate is pivoted at $d$ the block or bracket D, and to the latter is pivoted at $e$ the link E, the outer end of which is pivoted at $f$ to the link F, as shown. In one piece with the inner end of the link F is made a lateral flattened shank $f'$, adapted to be interlocked with the lock-plate G, secured to the top of the inner meeting-rail B and provided with an inclined notch or opening $g$, connected to a circular transverse perforation $g'$, as shown in Fig. 5.

$f''$ is a lip or projection on the link F for holding the links E and F together when the device is in the locked position shown in Fig. 1 and thus preventing the sashes from being moved one relative to the other when the device is in such locked position.

E'' is a side projection on the end of link E, serving as a stop for the link F when the device is used in the manner shown in Fig. 3.

The inner end of the flattened shank $f'$ on the link F is provided with a latch or thumb-piece $f^3$, preferably made concave on its two opposite sides, as shown in Fig. 4, for the purpose of manipulating the device during the locking and unlocking operation. The inner or pivotal end of the lever F is provided with a cam or eccentric $f^4$, which is adapted to enter a groove or recess C' in the plate C, attached to the outer meeting-rail A for the purpose of laterally moving the rails A B toward each other and holding them in close contact with each other when the device is locked, thus excluding dust, rain, and snow, as shown in Fig. 6.

If the device is in the locked position shown in Figs. 1, 2, and 6 and it is desired to unlock it, it is only necessary to swing the links E F toward the right to the position shown in dotted lines in Fig. 2, when by taking hold of the latch $f^3$ the flattened shank $f'$ on the lever F may be raised out of the notch $g$ on the plate G, causing the said lever F to be disconnected from the plate G, after which the levers E F are turned on the pivot $d$ a fourth of a revolution and placed in the position shown in Fig. 4, thus allowing the sashes to be moved by each other as far as may be desired. If it is desired to hold the windows partially open for ventilation of the room and still preventing their being opened from without, I swing the link E F from the locked position shown in Figs. 1 and 2 half a revolution toward the right, when by raising the lower sash or lowering the upper one the links will be held in a vertical (or nearly so) position, as represented in Fig. 3, in which position the flattened shank $f'$ is held interlocked with the plate G on the sash B, as shown.

It will be noticed that in this device the cam or eccentric $f^4$ is made integral with the front lever F; but instead of entering a groove or recess in the front plate G, that is attached to the inner sash-rail B, it enters a groove C' in the rear plate C, that is attached to the outer sash-rail A, as shown in the drawings, by which arrangement the sash-rails A B are closed tightly against each other when the links E F are in the locked position shown in Figs. 1, 2, and 6 without tending to pulling the said links E F apart, but, on the contrary, tends to close them and hold them closed together when in the locked position.

Having thus fully described the nature, construction, and operation of my invention, I wish to secure by Letters Patent and claim—

The herein-described window-fastener, consisting of a link or lever E, universally jointed to one of the sashes, combined with a link or lever F, pivoted to the lever E, and having a flattened shank $f'$ adapted to interlock with a notched lock-plate G secured to the other sash and a cam or eccentric $f^4$, on the inner end of the lever F, and a groove or recess C' on the plate C that is secured to the outer sash A, and with which the said cam is adapted to interlock for the purpose of holding the sashes pressed together when the device is locked without any tendency to pulling said levers apart, substantially as and for the purpose set forth.

In testimony whereof I have signed my name to this specification, in the presence of two subscribing witnesses, on this 18th day of December, A. D. 1896.

CHARLES M. FOWLER.

Witnesses:
ALBAN ANDRÉN,
LAURITZ N. MÖLLER.